Nov. 20, 1945.
W. H. CHURCHILL
2,389,121
SHIFTABLE COWL FASTENER DEVICE
Filed Jan. 6, 1943
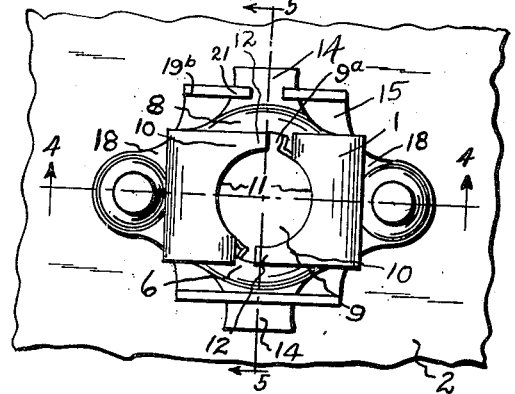
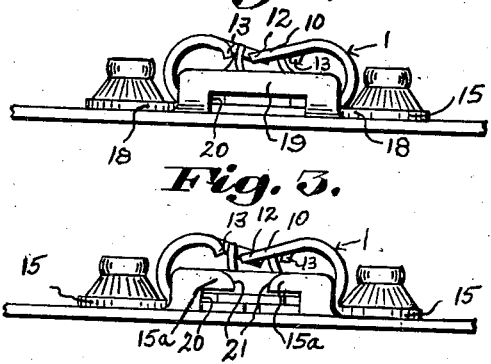
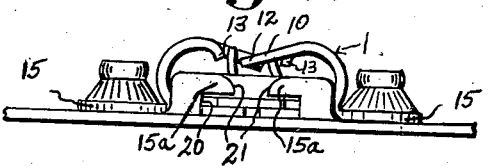
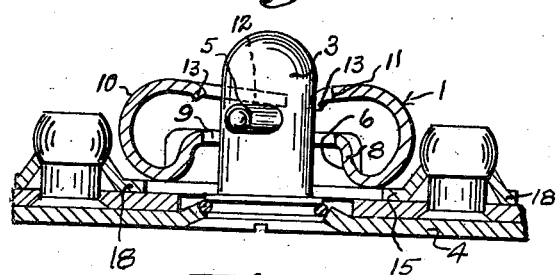
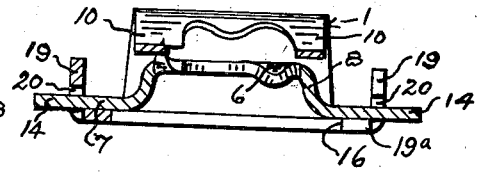
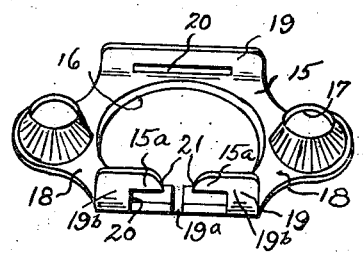
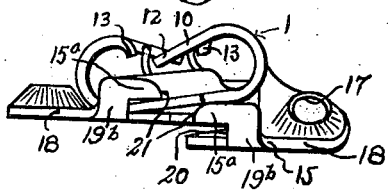
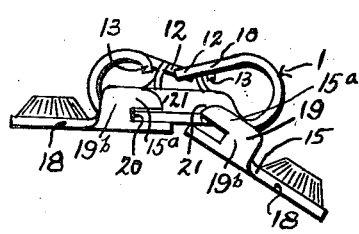
Inventor
Wilmer H. Churchill.
By Walter S. Jones
Attorney Patented Nov. 20, 1945

2,389,121

UNITED STATES PATENT OFFICE 2,389,121

SHIFTABLE COWL FASTENER DEVICE

Wilmer H. Churchill, Saugus, Mass., assignor to United-Carr Fastener Corporation, Cambridge, Mass., a corporation of Massachusetts Application January 6, 1943, Serial No. 471,398

7 Claims. (Cl. 24—221)

The present invention relates to improvements in rotary operative type fasteners, such as those employed for connecting airplane cowling sheets together, and aims generally to improve existing fasteners of that type.

More particularly the invention provides an improved construction of female fastener members and the attaching plate therefor and is an improvement over the construction shown in my co-pending application Serial No. 458,239, filed September 14, 1942.

Illustrative of the invention, reference is made to the accompanying drawing showing a preferred form of my improved fastener, and in which:

Fig. 1 is a plan view of the fastening as viewed from the female fastener side and illustrating my improved fastener member;

Fig. 2 is an elevation as viewed from one end thereof;

Fig. 3 is an end elevation thereof, as viewed from an opposite end;

Fig. 4 is a central longitudinal sectional view as taken on the line 4—4 of Fig. 1;

Fig. 5 is a central longitudinal sectional view of the female fastener member and attaching plate as taken on the line 5—5 of Fig. 1;

Fig. 6 is a detail perspective view of the attaching plate;

Fig. 7 is an end view illustrating how the attaching plate may be flexed in affixing the female fastener member thereto; and Fig. 8 is a similar view illustrating one manner of flexing the attaching plate to permit removal of the female fastener member therefrom.

Referring more particularly to the drawing, the invention provides new and improved means for shiftably attaching a female socket or fastener member to a suitable apertured support, such as an airplane cowling sheet, though it is to be understood that the invention is susceptible of general application and is not restricted to such use.

Rotary operative type fasteners, such as those used for securing airplane cowling sheets together, usually include a female fastener or socket member 1 suitably attached to one side of an apertured supporting sheet 2 and adapted to receive and interlock with a rotary male fastener member 3 rotatably mounted in a part 4 to be secured to the support 2. The rotary male fastener element preferably is formed with lateral projections 5, such as radial arms, adapted to overlie and be engaged with a locking seat 6 of the female fastener 1 spaced outwardly from the support 2 upon turning of the male element 3 and thus hold the support 2 and part 4 in rigid fastened relationship.

The female fastener or socket member may be of any approved type and construction to receive and lockingly cooperate with the rotary male element 3. In the illustrated form the socket member 1 is of the type disclosed and claimed in the copending application of William A. Bedford, Jr., Serial No. 420,554, filed November 26, 1941, now U. S. Patent No. 2,306,928 of December 29, 1942, for Rotary fastener devices and installations of the same.

Such socket members advantageously comprise a base portion 7 formed with an outwardly dished embossment or seat 8 having a central aperture 9 with radial elongations $9^a$ to receive the end of the stud 3 and radial arms 5 thereof, the marginal edge portions of the aperture presenting an upwardly sloping cam seat 6. Advantageously resilient wings 10 connected to the base extend upwardly and inwardly over the seat, the inner edges thereof being notched as at 11 to permit the passage of the end of the rotary male element therethrough. One side of said wings 10 is preferably downwardly inclined and disposed above the radial elongations as at 12 so as to engage a radial arm 5 of the stud when in unlocked position to automatically eject the stud from the socket member.

Another portion of the wing may be formed with a depending extension 13 extending toward the seat 6 for cooperation with the rotary male element to maintain it in fastened engagement with the seat, as disclosed in the Bedford patent No. 2,306,928 aforesaid.

The base portion 7 is advantageously formed with lateral extensions 14 constituting bearing portions adapted to bear slidably upon an attaching member or plate.

The invention provides an improved attaching plate for shiftably mounting the female fastener or socket member 1 and for attaching it to its support 2 overlying the aperture thereof. According to the invention the attaching plate comprises a substantially flat bearing plate 15 formed of relatively thin, resilient material and having an enlarged central aperture 16 which preferably is substantially larger than the aperture 9 of the embossment 8 of the socket member 1. The plate 15 is preferably formed with other apertures 17 for the reception of rivets or like fastenings by means of which the plate may be secured to the support 2 and advantageously these apertures 17 are found in extensions 18 extending laterally from opposite sides of said plate. Other opposite sides of the plate 15 intermediate the extensions 18 are formed with upstanding flanges 19 having apertures 20, providing apertured retainer portions or keepers for loosely receiving the bearing extensions 14 of the female fastener or socket member 1, the apertures 20 being substantially longer than the width of the extensions 14 so as to permit the socket to be shiftable on the plate in the direction of the flanges 19. The flanges 19 are spaced apart a distance greater than the width of the socket member but less than the overall length of the extensions 14 thereof so that the socket member 1 may be shiftable in a direction normal to the length of the flanges 19. By means of the construction, the socket member 1 is universally shiftable in all directions across the face of the plate so as to be accurately aligned with the rotary male element or stud, even though such stud is not accurately aligned with the center of the opening of the support 2.

Advantageously the socket member 1 may be readily assembled with the attaching plate by a snap fastener action prior to attachment to the support 2. This may be accomplished by dividing one of the flanges 19 into separate relatively resilient and separable parts. For example, as illustrated in Fig. 6, the metal on one side of the plate may be divided by a slot 19a extending from the aperture 16 outwardly and upwardly through the apertured flange 19 so as to divide the slotted flange 19 into two opposed yieldable portions 19b. The yieldable portions 19b of the attaching plate thus are relatively flexible and resilient, being connected together only at the opposite side of the aperture 16, and the divided flange 19 presents oppositely directed lugs 15a—15a having opposed curved or cam-shaped guiding surfaces 21 providing a tapering entering throat between them.

In assembling the socket member on the attaching plate, one of the bearing extensions 14 thereof is inserted in the aperture 20 of the undivided flange 19. The opposite extension 14 may be positioned readily in the slot formed by the aperture 20 in one of the yieldable flange portions 19b of on the opposite side of the plate, and one of the lugs is depressed to a position out of alignment with the other lug, as is illustrated in Fig. 7. In this position one side edge of the extension 14 bears on the cam surface 21 of the depressed lug. Pressure on the depressed lug to force it into a position in alignment with the other lug, separates the depressed lug laterally and permits the aperture 20 thereof to receive the extension 14 with a snap fastener action due to the resilience of the material of the plate 15.

If it is desired to remove the socket member from the attaching plate for any reason the plate may be distorted or bowed, as illustrated in Fig. 8, to a position where one of the notched lugs 15a may be disengaged from the extension. This disengaged lug may be then moved to the position illustrated in Fig. 7 and the socket member readily removed.

Advantages of the invention reside in the simplicity of the construction of the attaching plate which makes possible the ready assembly of the socket member therewith, and the removal of it therefrom, prior to attachment to the support. The socket member is thus shiftably attached to the attaching plate and may be inwardly shifted relative to the aperture in the support to facilitate lining up with the stud member 3. Furthermore, the fastened installation may creep slightly, due to the shiftable mounting of the socket member, without tendency to rotate either of the parts to unlocked position, as for example in case the parts 2 or 4 are flexed or relatively shifted by increased pressure.

While I have illustrated and described a preferred embodiment of my invention, I do not wish to be limited thereby because the scope of my invention is best defined by the following claims.

I claim:

1. In combination, a female fastener member designed to receive a rotary stud element having lateral projections, said member including a base having bearing extensions and a central outwardly dished apertured seat to receive and be engaged by the lateral projections of said stud element, and means for shiftably attaching said fastener member to an apertured support, said means comprising an attaching member having longitudinally spaced fastening portions for connection to the support, upstanding flanges formed on the marginal side portions of said attaching member intermediate said fastening portions, said flanges providing opposed apertured retainer portions disposed in planes parallel to a plane passed through said fastening portions and loosely receiving said bearing extensions and at least one of said retainer portions having a slotted portion leading into its aperture whereby one of said extensions may be inserted into the aperture through said slotted portion.

2. In combination, a female fastener member designed to receive a rotary stud element having lateral projections, said member including a base having bearing extensions and a central outwardly dished apertured seat to receive and be engaged by the lateral projections of said stud element, and means for shiftably attaching said fastener member to an apertured support, said means comprising an apertured attaching plate adapted to be attached to the support at longitudinally spaced points and providing a bearing surface for said extensions, upstanding apertured retainer portions on said plate loosely embracing said extensions, said attaching plate being slotted from the outer edge of one of the retainer portions to the central aperture of the plate to divide said retainer portion into relatively displaceable sections whereby one of the said extensions may be inserted into the aperture through the retainer slot by causing one of the displaceable sections to yield relative to the other.

3. In combination, a female fastener member designed to receive a rotary stud element having lateral projections, said member including a base having bearing extensions and a central outwardly dished apertured seat to receive and be engaged by the lateral projections of said stud element, and means for shiftably attaching said fastener member to an apertured support, said means comprising an apertured attaching plate attached to said support and providing a bearing surface for slidably supporting said extensions, upstanding slotted retainer portions on said plate loosely embracing said extensions, one side of said plate and one retainer portion being divided by a slot thereby providing relatively movable sections for cooperation with one of said extensions thereby permitting ready assembly and disassembly of the parts.

4. In combination, a female fastener member designed to receive a rotary stud element having lateral projections, said member including a base having bearing extensions and a central outwardly dished apertured seat to receive and be engaged by the lateral projections of said stud element, and means for shiftably attaching said fastener member to an apertured support, said means comprising an apertured attaching plate attached to said support and providing a bearing surface for said extensions, upstanding apertured retainer portions on said plate loosely embracing said extensions, one side of the plate and one of said retainer portions being slotted to provide two yieldable portions whereby one of the said extensions may be inserted into the aperture through the slot by causing one of the yieldable portions to yield relative to the other, and said apertured retainer portion having at least one cam surface adjacent to the slot for cooperation with the extension as and for the purposes illustrated and described.

5. Attaching means for shiftably attaching a female fastener member to an apertured support comprising a plate having a relatively flat centrally apertured body providing a slidable bearing surface for the fastener member, opposed extensions for connecting said plate to a support, and a pair of retainers extending from said body and disposed angularly to the plane of the bearing surface of the plate along opposed side margins thereof, said retainers each having elongated slots disposed in part in the plane of said bearing surface for loosely receiving parts of the fastener member, the elongated slot of one of the retainers being connected to the upper edge of the retainer and the central aperture of the plate by angularly disposed slots to divide said retainer into two relatively yieldable sections.

6. Attaching means for shiftably attaching a female fastener member type to an apertured support comprising a plate having a relatively flat centrally apertured body providing a slidable bearing surface for the fastener member, opposed extensions for connecting said plate to a support, and a pair of retainers extending from said body and disposed angularly to the plane of the bearing surface of the plate along opposed side margins thereof, said retainers each having elongated slots disposed in part in the plane of said bearing surface for loosely receiving parts of the fastener member, one of said retainers and an adjacent portion of the plate between the central aperture thereof and such retainer being slotted to divide said retainer and plate portion into two relatively displaceable sections.

7. Attaching means for shiftably attaching a female fastener member to an apertured support comprising a plate having a relatively flat centrally apertured body providing a slidable bearing surface for the fastener member, opposed extensions for connecting said plate to a support, and a pair of retainers extending from said body and disposed angularly to the plane of the bearing surface of the plate along opposed side margins thereof, said retainers each having elongated slots disposed in part in the plane of said bearing surface for loosely receiving parts of the fastener member, one of said retainers and an adjacent portion of the plate between the central aperture thereof and such retainer being slotted angularly to the first named slot of said retainer to divide said retainer and plate portion into two relatively displaceable sections.

WILMER H. CHURCHILL.